United States Patent
Chen et al.

(10) Patent No.: US 11,437,927 B2
(45) Date of Patent: Sep. 6, 2022

(54) VOLTAGE SOURCE CONVERTER GENERATING A PULSE TRAIN USING TWO VOLTAGE LEVELS

(71) Applicant: Hitachi Energy Switzerland AG, Baden (CH)

(72) Inventors: Nan Chen, Västerås (SE); Federico Bertoldi, Aargau (CH); Kalle Ilves, Stockholm (SE); Cicero Da Silveira Postiglione, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/272,076

(22) PCT Filed: Sep. 13, 2018

(86) PCT No.: PCT/EP2018/074721
§ 371 (c)(1),
(2) Date: Feb. 26, 2021

(87) PCT Pub. No.: WO2020/052760
PCT Pub. Date: Mar. 19, 2020

(65) Prior Publication Data
US 2021/0328523 A1  Oct. 21, 2021

(51) Int. Cl.
*H02M 7/483*  (2007.01)
*H02M 1/42*  (2007.01)
*H02M 1/14*  (2006.01)

(52) U.S. Cl.
CPC ....... *H02M 7/4835* (2021.05); *H02M 1/4233* (2013.01); *H02M 1/14* (2013.01)

(58) Field of Classification Search
CPC ...... H02M 1/14; H02M 1/4233; H02M 7/483; H02M 7/4835
See application file for complete search history.

(56) References Cited

U.S. PATENT DOCUMENTS

| | | | |
|---|---|---|---|
| 2018/0212533 A1* | 7/2018 | Nami | H02M 7/483 |
| 2019/0341838 A1* | 11/2019 | As | H02M 7/162 |
| 2020/0177099 A1* | 6/2020 | Slepchenkov | H02M 7/49 |

FOREIGN PATENT DOCUMENTS

| | | |
|---|---|---|
| EP | 3352361 A1 | 7/2018 |
| WO | 2016070378 A1 | 5/2016 |

OTHER PUBLICATIONS

Gowaid, I. A., et al., "Quasi Two-Level Operation of Modular Multilevel Converter for Use in a High-Power DC Transformer With DC Fault Isolation Capability", IEEE Transactions on Power Electronics, vol. 30, No. 1, Jan. 2015, pp. 108-123.

(Continued)

*Primary Examiner* — Kyle J Moody
*Assistant Examiner* — Lakaisha Jackson
(74) *Attorney, Agent, or Firm* — Slater Matsil, LLP

(57) ABSTRACT

A voltage source converter is configured to generate a pulse train using two voltage levels. The voltage source converter includes a first converter arm coupled between a junction and a first DC terminal having a first voltage level and a second converter arm coupled between the junction and a second DC terminal having a second voltage level. At least one of the first and second converter arms comprises cells. A string of capacitors is coupled between the first and second DC terminals. A control unit is configured to control a group of cells used in a transition between the first and second voltage levels for commutating a current running through a corresponding one of the first and second converter arms involved in the transition.

20 Claims, 6 Drawing Sheets

(56) References Cited

OTHER PUBLICATIONS

Shi, Yuxiang, "Isolated Modular Multilevel DC-DC Converter With DC Fault Current Control Capability Based on Current-Fed Dual Active Bridge for MVDC Application," IEEE Transactions on Power Electronics, vol. 33, No. 3, Mar. 2018, pp. 2145-2161.

Zhao, Hongfeng, et al., "A Novel Modulation Strategy for Isolated Modular Multilevel DC/DC Converter's Sub-module Dc Voltage Oscillation Damping," 2016 IEEE 8th International Power Electronics and Motion Control Conference, May 22-26, 2016, 6 pages.

* cited by examiner

# VOLTAGE SOURCE CONVERTER GENERATING A PULSE TRAIN USING TWO VOLTAGE LEVELS

CROSS-REFERENCE TO RELATED APPLICATIONS

This application is a national stage application of International Application No. PCT/EP2018/074721, filed on Sep. 13, 2018, which application is hereby incorporated herein by reference.

FIELD OF INVENTION

The present invention generally relates to a voltage source converter. More particularly the present invention relates to a voltage source converter configured to generate a pulse train using two voltage levels.

BACKGROUND

The Modular Multilevel Converter (MMC) is frequently used in different high voltage applications. The MMC employs submodules in phase arms between two Direct Current (DC) terminals for forming a sinusoidal waveform, such as an Alternating Current (AC) waveform. Such submodules comprise a pair of switches in parallel with a capacitor.

The Quasi-Two Level (Q2L) conversion technique has been introduced in various high-voltage applications, such as in power transmission and distribution systems. The Q2L conversion technique uses cells that resemble the submodules of the MMC. A Q2L converter more particularly uses two converter arms with cells, which are connected in parallel with DC link capacitors. The cells comprise a main switch in parallel with an auxiliary switch and a snubber capacitor. However, in the Q2L technique a single pulse train with pulses between two voltage levels is generated using the cells. This type of technique is for instance described by Gowaid et al in "Quasi Two-Level Operation of Modular Multilevel Converter for Use in a High-Power DC Transformer With DC Fault Isolation Capability", IEEE Transactions On Power Electronics, Vol. 30, No. 1, January 2015. It is also described by Mertens and Kucka in "Quasi Two-Level PWM Operation of an MMC Phase Leg With Reduced Module Capacitance", IEEE Transactions On Power Electronics, Vol. 31, No. 10, October 2016.

The Q2L converter can be considered to be an intermediate step between a standard two-level (2 L) converter and an MMC. It makes steps with a dwell time of $t_D$ during the transition between the two voltage levels present in the phase voltage waveform of a 2 L converter. This is done in order to limit the dv/dt produced by the converter during this transition. Higher values of dv/dt can result in increased electromagnetic interference (EMI) and insulation stress on reactors connected to the converter. Moreover, in Q2L, there are no advanced requirements on gate units as the series connection relies on active snubber and not on advanced gate unit.

The Q2L converter has an advantage compared to the MMC in that the required capacitance per cell is much lower than the corresponding capacitance per submodule. This reduction in capacitance occurs because each cell capacitance only charges or discharges during the time when transition between the upper and lower arms of one phase leg occurs. This is a significantly smaller charging/discharging time than what is seen by the submodule capacitors in an MMC.

There is a problem with the use of the Q2L converters and that is that resonances may occur in the converter arm current, the energy of which is dissipated over time as converter loss.

There is therefore a need for limiting such resonances in order to limit such losses.

It is thus of interest to obtain an improvement of the Q2L technique with regard to limiting of resonances.

SUMMARY OF THE INVENTION

The present invention is directed towards liming the resonances caused by the operation of a voltage source converter employing the Quasi-Two Level conversion technique.

This object is according to a first aspect achieved through a voltage source converter configured to generate a pulse train using two voltage levels, the converter comprising a first converter arm connected between a junction and a first DC terminal having a first voltage level, a second converter arm connected between the junction and a second DC terminal having a second voltage level and a string of capacitors connected between the first and second DC terminals, wherein at least one of the converter arms comprises cells;

the voltage source converter further comprising a control unit controlling a group of cells used in the transition between the two voltage levels for commutating a current running through a corresponding one of the converter arms involved in the transition, the group comprising the cells of the converter arm, where the control unit when controlling the group of cells is configured to obtain values of a current running between the string of capacitors and the converter arm and handle a cell of the group selected to be used last for reaching one of the voltage levels, which handling comprises inserting or bypassing the cell when the current between the string of capacitors and the converter arm is at a zero level.

The object is according to a second aspect achieved through a method of limiting resonance in a voltage source converter that generates a pulse train using two voltage levels, the converter comprising a first converter arm connected between a junction and a first DC terminal having a first voltage level, a second converter arm connected between the junction and a second DC terminal having a second voltage level and a string of capacitors connected between the first and second DC terminals, wherein at least one of the converter arms comprises cells, the method comprising controlling a group of cells used in the transition between the two voltage levels for commutating a current running through a corresponding one of the converter arms involved in the transition, the group comprising the cells of the converter arm, where the controlling of the group of cells comprises
obtaining values of a current running between the string of capacitors and the converter arm, and
handling a cell of the group selected to be used last for reaching one of the voltage levels, which handling comprises inserting or bypassing the cell when the current between the string of capacitors and the converter arm is at a zero level.

The object is according to a third aspect achieved through a computer program product for limiting resonance in a voltage source converter that generates a pulse train using two voltage levels, the converter comprising a first converter arm connected between a junction and a first DC terminal having a first voltage level, a second converter arm connected between the junction and a second DC terminal having a second voltage level and a string of capacitors connected between the first and second DC terminals, wherein at least one of the converter arms comprises cells, the converter comprising a control unit controlling a group of cells used in the transition between the two voltage levels for commutating a current running through a corresponding one of the arms involved in the transition, the group comprising the cells of the converter arm, the computer program product comprising a data carrier carrying computer program code causing the control unit controlling the group of cells to:

obtain values of a current running between the string of capacitors and the converter arm, and handle a cell of the group selected to be used last for reaching one of the voltage levels, which handling comprises inserting or bypassing the cell when the current between the string of capacitors and the arm is at a zero level.

A last cell of a transition may be a cell that is actively chosen by the control unit to be the last to be used in the transition. However, it does not have to be the cell that is physically connected last in a cell structure, such as in a converter arm.

According to some other aspects, the selection is made during the transition, i.e. when the commutation process is ongoing. The method may therefore also comprise selecting the cell that is to be used last in a transition during the transition, i.e. when the commutation is ongoing.

The values of the current running between the string of capacitors and the converter arm may be one or more measurements of the current.

In a transition there is furthermore a dwell time during which a group of cells remains at an intermediate step in the transition between two levels.

The capacitors of the group of cells may be connected in parallel with a branch of capacitors during the commutation, which branch comprises at least one of the capacitors of the string.

The control unit may furthermore be configured to obtain the cell voltages of the group of cells. The cell voltages may comprise one or more measurements of the cell voltage of each cell in the group.

In a first variation of the first aspect, the control unit may be further configured to determine a difference between the voltage of the branch of capacitors and a sum of cell voltages provided by the group of cells, wherein the last cell is handled when the voltage difference is negative.

In a corresponding first variation of the second, aspect, the method in this case comprises determining a difference between the voltage of the branch of capacitors and a sum of cell voltages provided by the group of cells, wherein the last cell is handled when the voltage difference is negative.

According to a second variation of the first aspect, the control unit is further configured to sort the cells according to a cell voltage balancing scheme so that the cell being inserted or bypassed last is the last cell of a cell sequence obtained through the sorting.

According to a corresponding second variation of the second aspect, the method further comprises sorting the cells according to a cell voltage balancing scheme so that the cell being inserted or bypassed last is the last cell of a cell sequence obtained through the sorting.

The cell that is to be used last in a transition between the two voltage levels may be selected by the control unit before the transition has been initiated. The method may therefore also comprise selecting the cell that is to be used last in a transition between the two voltage levels before the transition has been initiated.

The current running between the string of capacitors and the converter arm may additionally be obtained before the transition is initiated.

When this is done, the control unit may be further configured to predict when the current running between the string of DC link capacitors and the converter arm will reach zero based on the obtained current and the cell sequence according to the cell voltage balancing scheme and to handle the selected cell at the predicted zero level.

When this is done, the method may further comprise predicting when the current running between the string of DC link capacitors and the converter arm will reach zero based on the obtained current and the cell sequence according to the cell voltage balancing scheme. In this case the handling of the selected cell is made at the predicted zero level.

The dwell time may also be considered in the prediction.

The cell voltages of the cells in the group may likewise be obtained before the transition is initiated.

In this case, the control unit may additionally be configured to predict the sum of cell voltages provided by the group of cells during the transition based on the obtained cell voltages and the cell sequence, predict when the voltage difference is negative and handle the last cell when the voltage difference is predicted to be negative.

In this case the method may additionally comprise predicting the sum of cell voltages provided by the group of cells during the transition based on the obtained cell voltages and the cell sequence and predicting when the voltage difference is negative. The handling of the selected cell may in this case be performed when the voltage difference is predicted to be negative.

The dwell time may also be considered in these latter predictions.

In some variations of the voltage source converter the first and second converter arms comprise cells.

It is also possible that different control schemes are used in a transition between the two voltage levels, where in a first scheme the handling of the cells of the first and second arms is interleaved and in a second scheme the cells of one arm are all handled first, before the cells of the other arm are handled.

The last cell being handled may comprise a last cell being inserted in the first converter arm, which may be done for a transition from the first to the second voltage level in both the schemes.

The last cell being handled may comprise a last cell being bypassed in the second converter arm, which may be done for a transition from the first to the second voltage level in the first scheme.

The branch of capacitors may further comprise the complete link of capacitors.

The sum of cells of an arm may be rated for the full converter voltage, i.e. the difference between the first and the second voltage. Thereby these cells combinedly are dimensioned for handling the full converter voltage.

In some variations of the voltage source converter, it further comprises a third converter arm connected between the junction and a neutral point having a third voltage level between the first and second voltage levels, the neutral point being a midpoint of the string of capacitors string connected between the first and second DC terminals.

In such a voltage source converter comprising a neutral branch, the branch of capacitors may comprise one half of the string of capacitors.

It is possible that when the converter comprises a neutral branch, the first and second converter arms comprise cells and the neutral branch comprises bidirectional switches for connecting the junction to the neutral point. Alternatively the first and second converter arms may comprise switches and the neutral branch cells.

Cells may have a unipolar voltage contribution capability, which may be realized through the cells having a half-bridge structure.

Each cell may comprise a first main switch, a first auxiliary switch and a snubber capacitor, where the first main switches of the cells are configured to switch between the two voltage levels and the first auxiliary switches of the cells are configured to connect snubber capacitors to introduce a positive or a negative slope in the transition between the two voltage levels Each cell may additionally comprise a first damping resistor between the first auxiliary switch and the snubber capacitor.

It is furthermore possible that each cell comprises a first diode bypassing the first damping resistor. In one variation the first diode is connected between a first and a second junction, where the first junction is a junction between the first auxiliary switch and the first main switch and the second junction is a junction between the first damping resistor and the snubber capacitor.

Alternatively or additionally cells may have bipolar voltage contribution capability, for instance realized as full-bridge cells, i.e. cells having a full-bridge structure.

It is furthermore possible that the at least one arm comprising cells also comprises switches. In this case these are configured to be turned on when the cells of the arm are being operated for switching between two of the voltage levels.

If an arm comprises cells with bipolar voltage contribution capability, then each cell with bipolar voltage contribution capability may comprise a second main switch and a second auxiliary switch, where the second main switches of these cells are configured to switch between two voltage levels, one of which is another than those of the first main switches, and the second auxiliary switches of the cells are configured to connect the snubber capacitors to introduce a slope in the transition between the two levels operated by the second auxiliary switches.

In case the cells have a bipolar voltage contribution capability, then these cells may comprise a second damping resistor between the second auxiliary switch and the snubber capacitor.

The cells with bipolar voltage contribution capability may additionally comprise a second diode bypassing the second damping resistor. This bypassing may involve the second diode being connected between a third and the second junction and the second damping resistor being connected to the second junction. The third junction may be a junction between the second main switch and second auxiliary switch. Alternatively, the second diode may be connected in parallel with the second damping resistor.

If other cell structures than half-bridge and full-bridge cell structures are used in the converter, then the switches of these other cell structures may in an analogous manner be provided with damping resistors and optionally also with snubber diodes.

The switches of the cells may be Metal Oxide Semiconductor Field Effect Transistor (MOSFET) switches or similar switches or a combination of switches having bi-directional current handling capability. They may also be wideband gap devices, such as Gallium Nitride (GaN) switches or Silicon Carbide (SiC) switches, i.e. switches on SiC substrates.

The dwell time may be in the range of tens to hundreds of nano seconds for a fundamental AC frequency of 50 or 60 Hz, i.e. for a period of 0.02-0.017 seconds. The period may therefore be $10^4$-$10^6$ times longer than the dwell time.

The invention has a number of advantages. It reduces the losses caused by the resonances occurring through the use of the Quasi-Two Level (Q2L) conversion technique. Thereby also the efficiency is improved. This can be achieved without the requirement of any additional hardware or special cell design. It is possible to implement the invention only through additional software, which also makes it economical. The current stress on the components is also limited, which allows the component size to be reduced It also improves the tolerance of cell capacitor voltage ripple, allows the capacitance to be reduced as well as relaxes the dwell time requirements.

BRIEF DESCRIPTION OF THE DRAWINGS

The present invention will in the following be described with reference being made to the accompanying drawings, where FIG. 1 schematically shows a first cell-based voltage source converter.

DETAILED DESCRIPTION OF THE INVENTION

In the following, a detailed description of preferred embodiments of the invention will be given.

Figure 1:
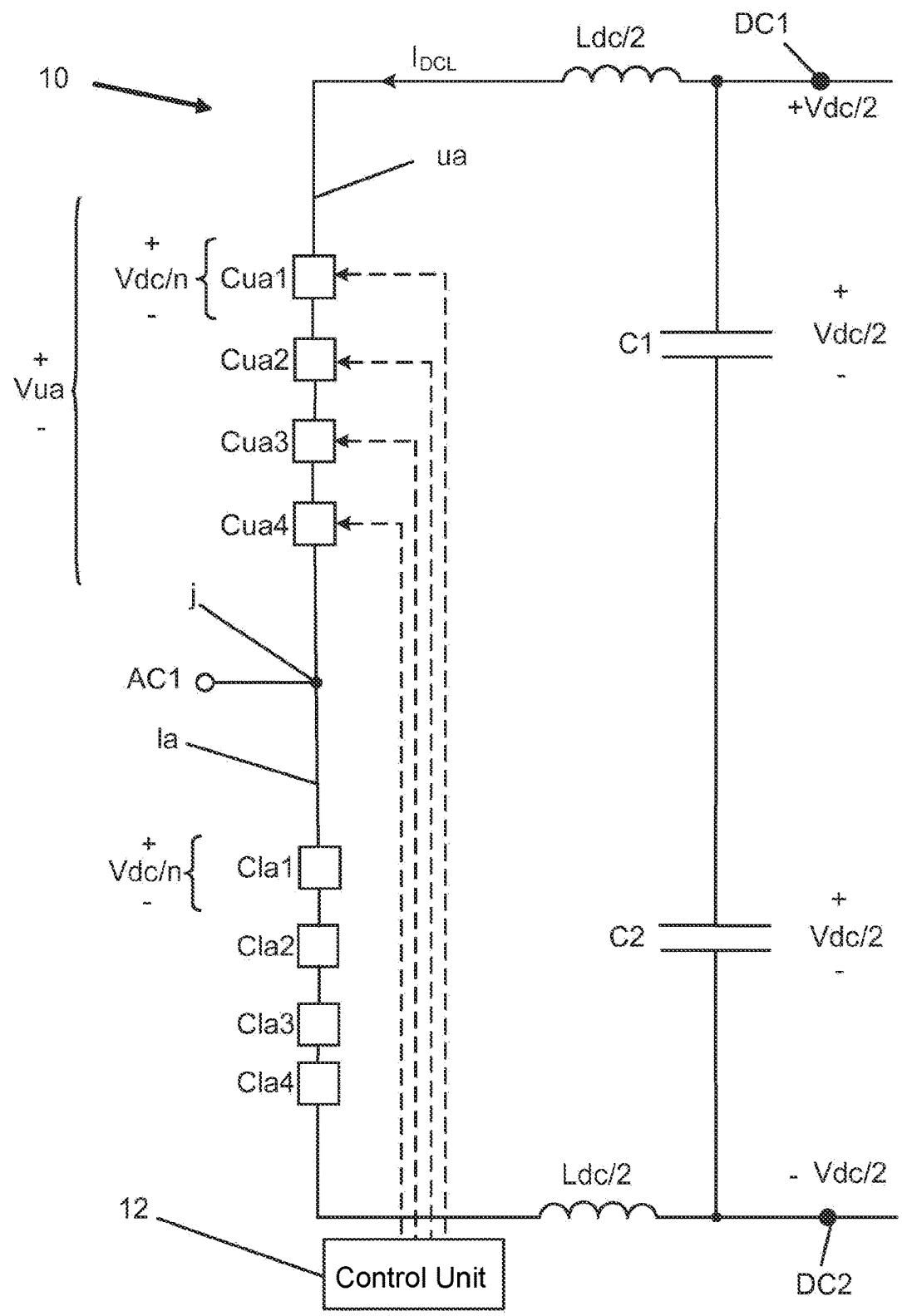

FIG. 1 shows one variation of a converter in the form of a cell-based voltage source converter 10. The converter operates to convert between alternating current (AC) and direct current (DC). The converter 10 in FIG. 1 is shown as comprising two arms, which two arms are related to a single AC phase. It should however be realized that there may be three different phases and thus a totality of six different arms, with two arms for each phase.

As can be seen in the figure there is a first upper converter arm ua having a first end connected to a first DC terminal DC1 via an upper link inductor Ldc/2 and a second end connected to a first junction j. There is also a second lower converter arm la having a first end connected to the junction j and a second end connected to a second DC terminal DC2 via a lower link inductor Ldc/2. There is also a string of capacitors C1 and C2 connected between the first and second DC terminals DC1 and DC2. At the junction j there is also provided a first AC terminal AC1 on which an output voltage is provided.

In a three-phase case there would be three groups of arms, where each group comprises an upper arm and a lower arm connected to a corresponding AC terminal, with the first arms of all groups being connected to the first DC terminal and all second arms connected to the second DC terminal.

The first DC terminal DC1 may be connected to a first pole of a DC power transmission system, such as a High Voltage Direct Current (HVDC) power transmission system and the second DC terminal DC2 may be connected to a second pole of the same system.

The first DC terminal DC1 furthermore has a first potential or voltage level +Vdc/2 that may be positive. The first pole may therefore also be termed a positive pole. The second DC terminal DC2 has a second potential or voltage level −Vdc/2 and the second pole may therefore be termed a negative pole. The AC terminal AC1 may be connected to an AC system, for instance via a transformer.

As mentioned above, the type of voltage source converter shown in FIG. 1 is only one example of a converter where the invention may be used. It is for instance possible to use the converter as a reactive compensating device, such as a Static Compensator.

The voltage source converter depicted in FIG. 1 has a symmetric monopole configuration. It is thus connected between a positive and negative potential. As an alternative it may be connected in an asymmetric monopole configuration or a symmetric bipole configuration.

In the example given in FIG. 1 there are four series-connected or cascaded cells in the upper and lower arms ua and la. Thus, the upper arm ua includes four cells Cua1, Cua2, Cua3 and Cua4, while the lower arm la includes four cells Cla1, Cla2, Cla3 and Cla4. Across each cell there is a voltage of Vdc/n, where n is the sum of cells in the upper or lower arms, which means that the sum of cells in an arm provides the voltage of Vdc. However, the rating of the cells in the arm in the converter in FIG. 1 is typically Vdc/n. Also, the upper arm voltage Vua and DC link current $I_{DCL}$ between the string of DC capacitors and the upper arm ua is also indicated. This current, which is also termed a DC link current, runs from the first DC terminal DC1 through the upper arm ua towards the AC terminal AC1.

The number of cells provided in FIG. 1 is only an example. It therefore has to be stressed that the number of cells in an arm may vary, where the number typically depends on the shape that is to be created in the AC terminal AC1 and the magnitude of the voltages involved.

There is also a control unit 12 provided for controlling all the arms of the converter 10. However, in order to simplify the figure only the control of the cells Cua1, Cua2, Cua3 and Cua4 in the upper arm ua are indicated with dashed arrows in FIG. 1. The control unit 12 may be implemented through a computer or processor with associated program memory. Other types of realizations such as using Field-Programmable Gate Arrays (FPGAs) are also possible.

Figure 2A:
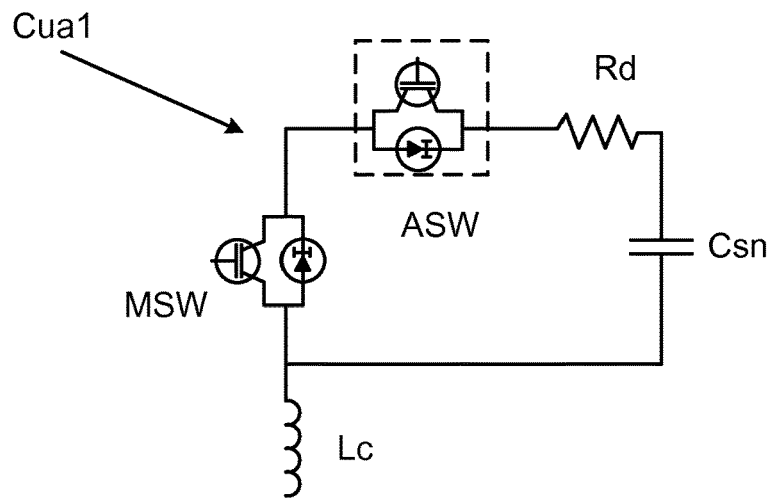
FIG. 2A shows a first variation of a half-bridge cell for use in the converter of FIG. 1.
Figure 2B:
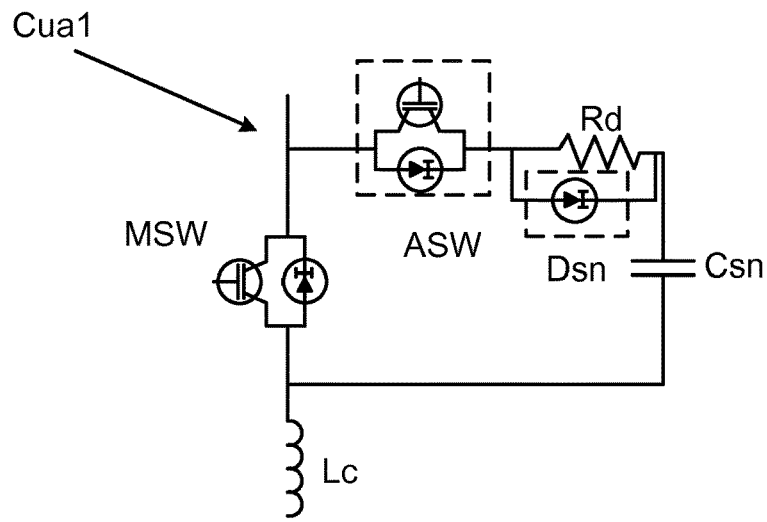
FIG. 2B shows a second variation of a half-bridge cell for use in the converter of FIG. 1.
Figure 2C:
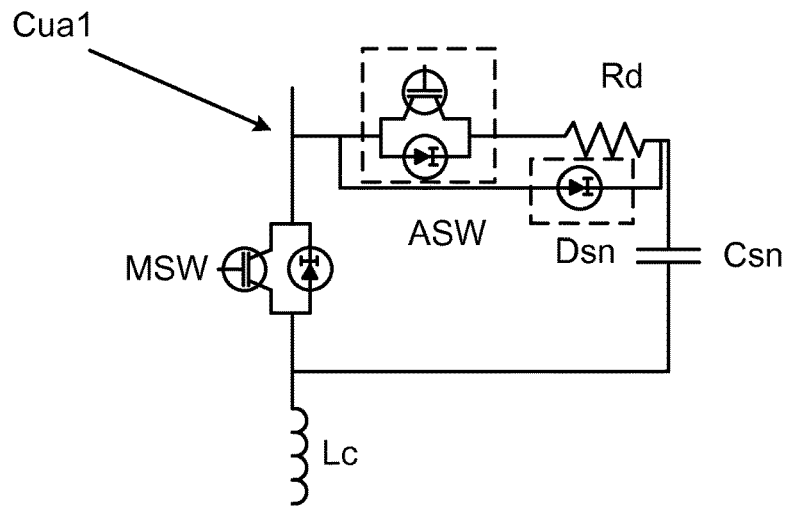
FIG. 2C shows a third variation of a half-bridge cell for use in the converter of FIG. 1, FIG. 3 schematically shows various voltages and currents for a conventionally operated converter.

As was mentioned above, the upper and lower arms ua and la of the voltage source converter to in the example in FIG. 1 comprise cells. A cell is a unit that may be switched when transitioning between two voltage levels at the junction j. It is more particularly provided for giving the edges of pulses generated at the junction j a slope, which is a positive slope when transitioning from −Vdc/2 to +Vdc/2 and a negative slope when transitioning from +Vdc/2 to −Vdc/2. Positive and negative slopes are here two types of slopes that can be provided in the transition. A cell with unipolar voltage contribution capability, such as a cell having a half-bridge structure, is suitable for use in the upper and lower arms ua and la. An example of such a cell is schematically shown in FIG. 2A. FIGS. 2B and 2C show variations of the cell.

The cell Cua1 shown in FIG. 2A comprises a first main switch MSW and in parallel with this first main switch MSW there is a branch comprising a snubber capacitor Csn in series with a second auxiliary switch ASW. In the cell Cua1 shown in FIG. 2A there is also an optional damping resistor Rd connected in the branch between the auxiliary switch ASW and the snubber capacitor Csn. There is also a cell inductance Lc having a first end connected to the junction between the main and auxiliary switch MSW and ASW. A first connection terminal of the cell Cua1 is in this case provided at the first junction between the two switches MSW and ASW and a second connection terminal is provided at a second end of the cell inductance Lc. The cell Cua1 may be switched to provide a voltage contribution corresponding to the voltage of the snubber capacitor Csn or a zero-voltage contribution. When providing a voltage corresponding to the voltage of the snubber capacitor Csn, the cell Cua1 inserts the voltage of the snubber capacitor Csn in the arm in which it is included. When no voltage or a zero voltage is provided by the cell Cua1, then the snubber capacitor Csn is bypassed and thereby the voltage is removed. The cells may thereby be considered to be inserted or alternatively bypassed. In the examples given here the switches are realized as semiconductor switches in the form of Metal Oxide Semiconductor Field Effect Transistor (MOSFET) switches, which may be provided on a suitable substrate such as Silicon (S) or Silicon Carbide (Si), where SiC is preferred. A switch is thereby an Si switch or an SiC switch. It should be realized that other types of semiconductor realizations may be used such as an Insulated Gate Bipolar Transistor (IGBT) and anti-parallel diode on suitable substrate such as Si or SiC. The anti-parallel diode is in-built in the MOSFET. However, in the figure they are shown as being external, which is done for better understanding of the operation. As was mentioned above it is also possible to omit the damping resistor Rd. When the damping resistor Rd is included, it is furthermore possible to also include a snubber diode Dsn that bypasses the damping resistor Rd and conducts current towards the snubber capacitor Csn. One such variation is shown in FIG. 2B, where a snubber diode Dsn is connected in parallel with the damping resistor Rd.

Another variation is shown in FIG. 2C, where the snubber diode Dsn is connected between a first and a second junction, where the first junction is a junction between the two switches ASW and MSW and the second junction is a junction between the damping resistor Rd and the snubber capacitor Csn.

As was mentioned above, the cells are used for introducing a slope in the transition between two voltage levels. The operation to achieve this will now be described in some more detail.

The voltage on the AC output AC1 is a train of pulses, where the voltage varies between two levels; a high level defined by +Vdc/2 and a low level defined by −Vdc/2. In the transition from one level to another, the control unit 12 inserts or bypasses the cells from the arms so that a stepping is made, which stepping causes the slope in the transition between the two levels. Such slopes may also be termed pulse edges. The amount of time that a cell remains or dwells at such a step is termed a dwell time $t_D$. The dwell time $t_D$ may be in the range of tens to hundreds of nano seconds for a fundamental AC frequency of 50 or 60 Hz on the AC terminal, i.e. for a period of 0.02-0.017 seconds. The period may therefore be $10^4$-$10^6$ times longer than the dwell time.

The snubber capacitor Csn thus inserts a voltage that is used to adjust the pulse edge. The damping resistor Rd in this case dampens the current through the snubber capacitor Csn. In case a snubber diode Dsn is included it reduces the losses in the resistor Rd.

There are a number of ways in which the upper and lower arms ua and la may be operated when transitioning between two levels +Vdc/2 and −Vdc/2. In a first scheme the operation of the arms is interleaved, while in a second scheme the cells of one arm are operated first and when this operation is finished, the cells of the other arm are being operated.

In the first scheme, cells are progressively bypassed in one arm as other cells are being inserted in the other. By doing so, n cells are always connected in parallel to the string of DC link capacitors C1 and C2.

For an outgoing current, i.e. a current leaving the converter from the AC terminal Ac1, when the voltage transitions from the first voltage level Vdc/2 to the second voltage level −Vdc/2, which transition is also referred to as a commutation from the upper to the lower arm as the current commutates from the upper to the lower arm, the control is the following:

The process starts by the control unit 12 turning off one of the main switches MSW in one of the cells in the upper arm ua such as in the first cell Cua1, and at the same time, turning off an auxiliary switch ASW in one of cells in the lower arm la, such as in the first cell Cla1. The first main switch MSW that is turned off first in the upper arm ua, switches with the full phase current, while the auxiliary switch ASW in the lower arm la that is turned off first, turns off with zero current.

This procedure is then followed for the rest of the cells involved in the transition.

Thereby all cells in the upper arm ua are consecutively inserted, while those in the lower arm la are bypassed or removed. Those in the upper arm ua with decreasing current; those in the lower arm la with increasing current.

Given that the phase current is positive and cells in the upper arm ua are being inserted, the snubber capacitor Csn of the cell being inserted first is the one that will be charged the most. Analogously, the capacitor Csn of the cell being bypassed or removed last in the lower arm la is the one discharged the most, since the current is flowing out of the capacitor in the lower arm.

For an outgoing current when the voltage transitions from the second voltage level −Vdc/2 to the first voltage level +Vdc/2, which transition is also referred to as a commutation from the lower to the upper arm as the current commutates from the lower to the upper arm, the control is the following:

The process starts by setting to zero the gate signal of one main switch MSW in the lower arm la, such as the main switch MSW in the first cell Cla1, and an auxiliary switch ASW in the upper arm ua, such as the auxiliary switch ASW in the first cell Cua1, and turning on the auxiliary and main switches ASW and MSW of the same cells, respectively, with interlocking delay, i.e. with a delay so that it is ensured that the main and auxiliary switches of a cell are not on at the same time.

Progressively, all cells in the lower arm la are inserted, while those in the upper arm ua are bypassed. Those in the lower arm la, with decreasing current; those in the upper arm ua with increasing current.

Given that the phase current is positive and cells in the lower arm are being inserted, the capacitor of the first cell that is inserted is the one that will be discharged the most. Analogously, the capacitor of the cell to be bypassed last in the upper arm is the one charged the most.

For an ingoing current, i.e. a current entering the converter 10 via the AC terminal Ac1, when the voltage transitions from the first voltage level +Vdc/2 to the second voltage level Vdc/2 and also commutates from the upper to the lower arm, the control is the following:

The process starts by setting to zero the gate signal of one main switch MSW of a cell in the upper arm ua, like the first cell Clu1, and an auxiliary switch ASW of a cell in the lower arm, like the first cell Cla1, and turning on the auxiliary and main switches ASW and MSW of the same cells, respectively, with interlocking delay.

Progressively, all cells in the upper arm ua are inserted, while those in the lower arm la are bypassed. Those in the upper arm ua with decreasing current; those in the lower arm with increasing current.

As cells in the upper arm are inserted, and given the phase current is negative, the capacitor of the cell that is inserted first is the one that will be discharged the most. Analogously, the capacitor of the cell to be bypassed last in the lower arm la is the one charged the most.

For an ingoing current when the voltage transitions from the second voltage level −Vdc/2 to the first voltage level +Vdc/2 and also commutates from the lower to the upper arm la and ua, the control is the following:

The process starts by turning off one of the main switches MSW in the lower arm la, such as in the first cell Cla1, and, at the same time, the turning off of an auxiliary switch ASW in the upper arm ua, such as the first cell Cua1.

The main switch MSW turned off first in the lower arm la, switches with the full phase current, while the auxiliary switch ASW turned off first in the upper arm ua turns off with zero current.

Consecutively, all cells in the lower arm la are inserted, while those in the upper arm ua are bypassed. Those in the lower arm la, with decreasing current; those in the upper arm with increasing current.

As cells in the lower arm la are inserted, and given the phase or output current is negative, the capacitor of the cell that is inserted first is the one that will be charged the most. Analogously, the capacitor of the cell to be bypassed last in the upper arm ua is the one discharged the most, since the current is flowing out of the capacitor in the upper arm.

In the above described way the transition between the two voltage levels for the two different current conduction directions according to the first scheme is being controlled by the control unit 12.

Now a second scheme of controlling cells will be described.

For an outgoing current with an upper to lower arm commutation, the operation is the following;

(1) Before Commutation

The gate signal to the auxiliary switches ASW in the lower arm la is 0. No commutation path is thereby available through the switches in the lower arm. The commutation will then involve only the upper arm ua.

(2) Commutation Process

Progressively, the main switches MSW in the upper arm ua are turned off and the auxiliary switches ASW in the upper arm ua are turned on with interlocking delay.

With the turn-off event of the main positions, the current is forced to commutate through the diodes in the upper arm ua.

In the upper arm: all main switches MSW turn-off with full current; all diodes of the auxiliary switches ASW see full phase current; the auxiliary switches ASW turn-on with zero voltage (auxiliary switch diode is conducting).

The current commutates when the accumulated total inserted upper arm cell voltage is higher than the DC-link voltage, (normally but not necessarily when the last main switch MSW in the upper arm ua is switched off), following the RLC circuit resonant commutation.

(3) After Commutation

The main switches MSW in the lower arm la are turned on with zero voltage.

For an outgoing current with a lower to upper arm commutation, the operation is the following;

(1) Before Commutation

The gate signal to the main switches MSW in the lower arm la is 0. No current path is available through the auxiliary switches ASW in lower arm la, as they were already turned off. Thus, the current will commutate through the cells in the upper arm ua.

(2) Commutation Process

Progressively, the auxiliary switches ASW in the upper arm ua are turned off and the main switches MSW in the upper arm ua are turned on with interlocking delay.

As soon as one main switch MSW in the upper arm is first turned on, the current starts commutating through the cells in the upper arm ua. In particular, the current commutates through the diodes in the upper arm.

In the upper arm: all main switches MSW (except the one being turned on first) turn on with full current; all diodes of the auxiliary switches see full phase current; the auxiliary switches ASW turn off with zero voltage (auxiliary switch diodes are conducting).

The current commutates when the first main switch in upper arm is turned on, with a di/dt di/dt=Vcell/Lloop, where Lloop is the inductance of the commutation loop formed by the cell inductances Lc and the DC link inductances Ldc/2+Ldc/2.

(3) After Commutation

The auxiliary switches ASW in the lower arm la are turned on with zero current.

For an ingoing current, and an upper to lower arm commutation the operation is the following:

(1) Before Commutation

The gate signal to the main switches MSW in the upper arm ua is set to 0. No path is available for the current through the auxiliary switches ASW in upper arm ua, as they were already turned off.

(2) Commutation Process

Progressively, the auxiliary switches ASW in the lower arm la are turned off and the main switches MSW in the lower arm la are turned on with interlocking delay.

As one main switch MSW is first turned on in the lower arm la, the current starts to commutate through the diodes in the lower arm la.

In the lower arm: all main switches MSW (except the one being turned on first) turn on with full current; all diodes see full phase current; the auxiliary switches ASW turn off with zero voltage (diodes of the Auxiliary switches ASW are conducting).

The current commutates with di/dt di/dt=Vcell/Lloop

(3) After Commutation

The auxiliary switches ASW in upper arm ua are turned on with zero current.

For an ingoing current and a lower to upper arm commutation the operation is the following:

(1) Before Commutation

The gate signal to the auxiliary positions in the upper arm ua is set to zero. No commutation path is available for the current through the switches in upper arm.

(2) Commutation Process

Progressively, the main switches MSW in the lower arm la are turned off and the auxiliary switches ASW in the lower arm la are turned on with interlocking delay. When accumulated total inserted lower arm cell voltage is higher than the DC-link voltage, (normally but not necessarily when the last main switch MSW is turned off in the lower arm la), the current commutates through the diodes in the lower arm la.

In the lower arm: all main switches MSW turn off with full current; all diodes of the auxiliary switches ASW see full phase current; the auxiliary switches ASW turn on with zero voltage (auxiliary switch diode is conducting). As the lower arm is being inserted, it parallelizes with the DC-link thanks to the auxiliary switches AUX that are turned on. The current commutates following RLC circuit resonant commutation.

(3) After Commutation

Main switches MSW in the upper arm ua are turned on with zero voltage (diode is conducting).

Above two schemes were described according to which the cells are controlled using the Q2L conversion technique for transition between two voltage levels.

There is a problem with the use of the Q2L conversion technique and that is that there may occur resonances on the DC link or phase arm current in at least some of the above-mentioned commutations according to the first and second schemes.

Moreover, the energy of these resonances is typically dissipated as heat.

This leads to converter losses and thus has a negative effect on the efficiency of the conversion. It is therefore of interest to limit such losses.

The inventors have discovered that the loss is caused by the parallelization of arm cell capacitor against the converter DC-link capacitors. Such loss could be comparable to the switching loss of an SiC switch, and further increase with converter dwell time. This will further put constraints on the controller's freedom to choose dwell time in operation.

Figure 3:
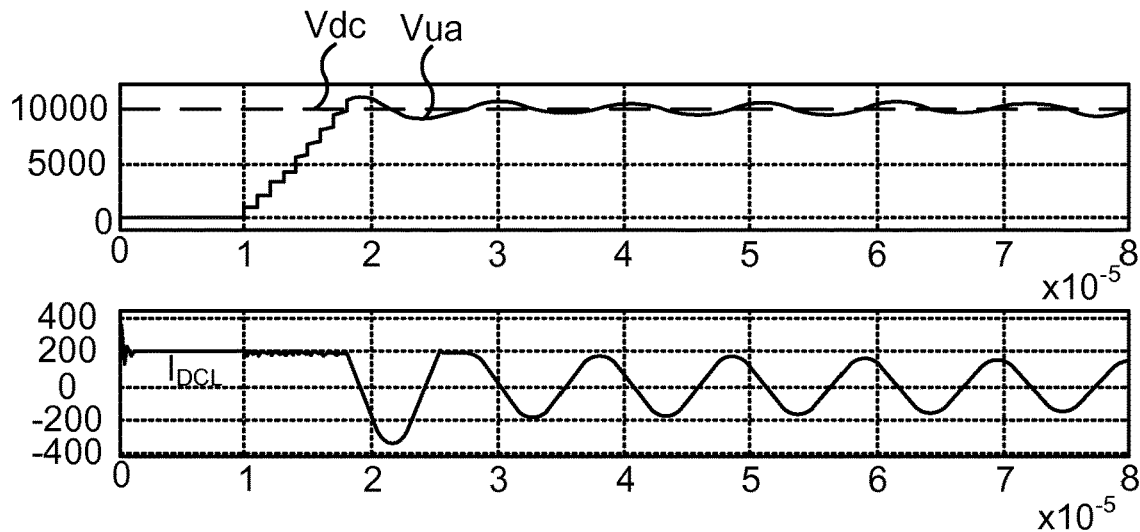

The cause of the resonances will be better understood when studying FIG. 3, where the upper drawing shows the DC link voltage Vdc and the sum of the voltages of the inserted cells of the upper arm in the form of the upper phase arm voltage Vua, while the lower drawing shows the DC link current $I_{DCL}$, which is a current running between the string of DC capacitors and a converter arm that is to be commutated, which as an example is the upper converter arm ua. FIG. 3 thus shows curves of voltages and currents during operation of the upper arm according to the second type of scheme for the case of an outgoing current and an upper to lower arm commutation.

The root-cause of parallelization loss for the converter is due to the unbalanced voltage level between the converter DC-link voltage Vdc and sum of cell voltages in an arm of a certain commutation process, which is exemplified by the upper arm voltage Vua. Thus, in the converter operation, this portion of unbalanced capacitor energy could not be controlled and guided into either the converters input or output, but just dissipated in the loop resistance as loss.

Moreover, the parallelization loss may increase with the dwell time of the Q2L based converter, and at 200 ns case such loss may be comparable to the switching loss of a converter using SiC switches and contribute to 25% of the total loss.

In order to solve this problem of resonance induced losses, it is generally proposed to handle one of the cell capacitors used in commutation in a special way which provides a compensation voltage at the time point of loop current zero cross. Thus by 'kicking into' a voltage step at the right time, the CLC loop formed by the DC link capacitors, link inductances Ldc/2 and cell capacitors Csn and inductances Lc, will suddenly reach a balanced status and the resonance will be 'cut-off'. This last inserted capacitor may be considered to be a 'resonance cutting capacitor/cell".

It can be realized that such problem and solution is very fundamental and critical for any Q2L based converter for the following reasons:

1. This problem is theoretically equivalent to the circulating current for an MMC converter, which is a well-known phenomenon for MMC control and application.
2. The reason that MMC do not suffer with such parallelization loss mainly because for MMC it is composed of very larger arm inductor (in the range of mH) and cell capacitor (in the range of mF), which enable a phase loop resonance at very low frequency. The modulation frequency of the MMC is fast enough to control and regulate such a loop current and thus avoid excessive energy loss.
3. However, for the Q2L based converter, due to the very high resonate frequency (L: in the range of µH; C: in the range of µF), it is impossible, even for SiC devices, to modulate within the resonance cycle. Thus, a new approach is needed to control the current flow, or otherwise the energy can only be dissipated as converter loss.

Figure 4:
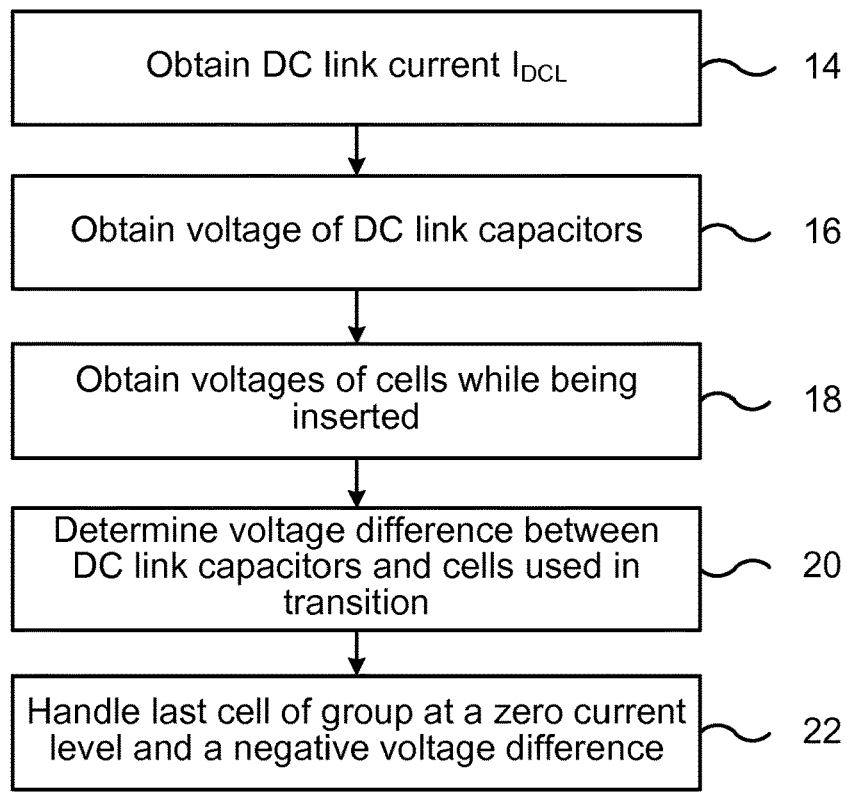
FIG. 4 shows a flow chart of a number of method steps in a first way to control the converter for limiting resonance.

How this is solved will now be described in some more detail with reference also being made to FIG. 4, which shows a flow chart of a number of method steps in a method of limiting resonances being performed by the control unit 12 and to and to FIG. 5, which shows the same voltages and current as in FIG. 3. The upper drawing of FIG. 5 thus shows the DC link voltage Vdc and upper phase arm voltage Vua and the lower drawing shows the DC link current $I_{DCL}$ when the control is used for an upper to lower arm commutation with an outgoing current using the second scheme.

The control unit 12 controls a group of cells used in the transition between the two levels with a certain slope for commutating a current running through a corresponding one of the arms involved in the transition, where the group comprises the cells of the arm from which the current is commutated.

In the exemplifying generation of a pulse train the second scheme is used and there is an outgoing current. Moreover, a transition is to be made from the first voltage level +Vdc/2 to the second voltage level −Vdc/2. Because of this the group of cells only comprises the cells in the upper arm ua and the current that is to be commutated is the current running through the upper arm. The transition also has a negative slope. At the start of the transition, the sum of voltages of the non-inserted cells that are assigned to be used is typically the same as the DC link voltage Vdc.

The assigned cells to be inserted thus typically have voltages, the sum of which corresponds to the desired voltage level of the transition. However, when the cells are actually being inserted, they may get charged or discharged depending on the current conduction direction. This means that there may exist a voltage difference between the DC link voltage Vdc and the sum of cell voltages Vua used for the transition. If for instance the cells are being charged they will reach a voltage level that makes the sum of cell voltages connected in parallel with the branch of capacitors differ from the DC link voltage and therefore resonance may occur, as seen in the current $I_{DCL}$ and arm voltages Vua shown in FIG. 3.

For an arm through which a current is running into the AC terminal, such as the upper arm ua, the control unit 12 has the following operation.

The control unit 12 controls a group of cells comprising cells in at least one of the arms to make a transition between the two levels, which control in the present example is made using the earlier described second scheme. In the example the group is made up of all the cells of the upper arm ua. Therefore, the control involves inserting the cells in the upper arm and when the insertion of all the cells is completed there follows bypassing of the cells in the lower arm.

In order to limit resonances, the control unit 12 obtains values of the current that runs between the DC link capacitors C1 and C2 and the converter arm that is to be commutated, which in this case is the DC link current $I_{DCL}$, step 14, This current may for instance be obtained via a current transformer connected to the DC link.

Optionally the control unit 12 also obtains values of the voltage across a branch of DC link capacitors that are to be connected in parallel with a group of cells used for the transition, step 16. The capacitors of the group of cells are thereby to be connected in parallel with the branch of capacitors during the commutation. The branch comprises at least one of the capacitors of the string and in the present example the branch of capacitors is identical to the string of DC link capacitors, i.e. the branch comprises all of the DC link capacitors. It thus comprises both the first and the second DC link capacitor C1 and C2. The voltages of the DC link capacitors may be obtained through measuring the DC link voltage Vdc, for instance using a voltage transformer.

The control unit 12 may optionally also obtain the voltages of the snubber capacitors Csn of the cells of the group as they are being used for current commutation in the transition, step 18. As the second scheme for the transition between two of the levels with a negative slope is used in the present example, the cells are the cells in the upper arm ua that are being inserted.

Moreover, in the control, the control unit 12 may monitor the DC link current $I_{DCL}$ with regard to reaching a zero level.

In case the voltages of the branch of capacitors as well as the cell voltages are obtained, then the control unit 12 may also determine a difference between the voltage Vdc of the branch of DC link capacitors and a sum of voltages Vua provided by the group of cells, step 20, which may be the sum of inserted cell voltages of the group of cells.

During the transition, the control unit 12 then selects cells to be handled for reaching the second voltage level −DC/2, which selection may involve using a certain dwell time at each step. This selection may also involve selecting a last cell to be handled for reaching the voltage level. All but the last cell to handled may then be inserted or bypassed using a dwell time that achieves a desired slope.

According to aspects of the invention, the control of the group of cells to make the transition between the two levels comprises handling a cell of the group selected to be used last for reaching one of the levels, which handling comprises inserting or bypassing the cell when the DC link current is at a zero level. This may be when the current is close to zero, has reached zero or is crossing zero. In the exemplifying second scheme this involves the control unit controlling the last cell of the upper arm ua to be inserted at a zero current level, which may be at a current zero crossing, step 22. The cell for which this is done may as an example may be the fourth cell cua4.

When the difference between the voltage of the branch of DC link capacitors and the sum of inserted cell voltages of the group of cells is determined, the handling, of the last cell, i.e. the inserting or removing of the last cell, may additionally be made when the voltage difference is negative. In the present example, the last cell in the upper arm is inserted when the voltage difference is negative.

The control unit 12 may thus insert the last cell when both conditions are fulfilled, i.e. when the DC link current is at a zero level, such as when it has a current zero crossing, and the difference is negative.

Figure 5:
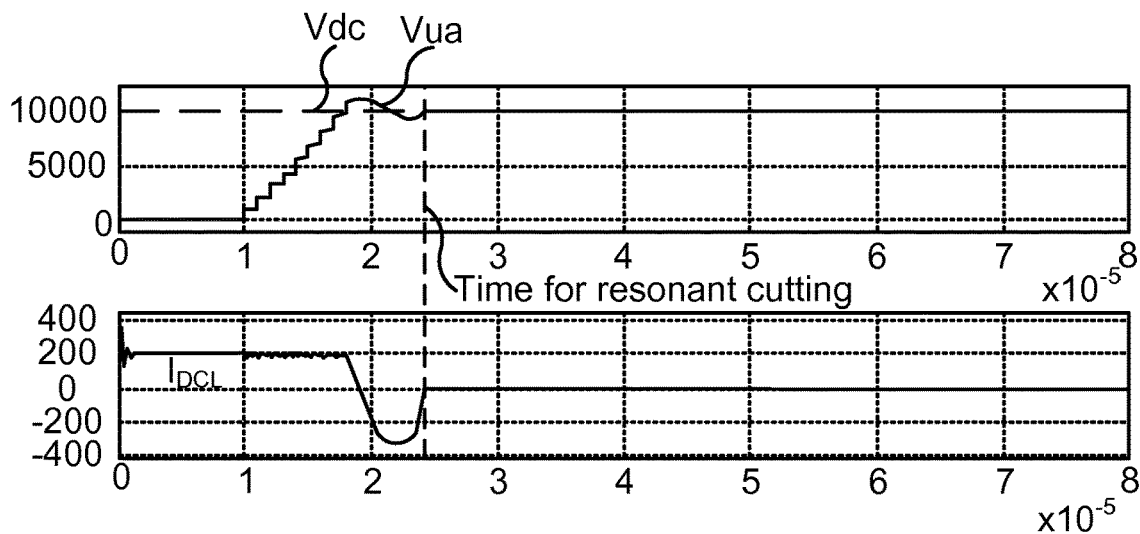
FIG. 5 shows various voltages and currents in the converter during the control for limiting resonance.

This operation is clearly seen in FIG. 5.

Due to the direction of the DC link current, the inserted cells are being charged, leading to the desired voltage level being reached before the last cell is inserted. Through delaying the insertion of the last cell in the upper arm until a current zero level is reached and optionally also until the above-mentioned difference is negative, it can be seen that the resonance is significantly limited and thereby also the losses are reduced.

It can thereby be seen that the resonance and thereby also the losses are limited.

It should here be realized that in case there is a transition from the second to the first voltage level, i.e. a positive slope, and an ingoing current using the second scheme, which current is passing through the lower arm la, then the same type of operation would be performed for the cells being inserted in the lower arm.

In case the first scheme is used in the above-mentioned transition from the first to the second voltage level, then the group of cells involves the cells in both the upper and lower arms. Moreover, in this case the last cell used in the group may be a cell that is bypassed in the lower arm. In this case it is therefore possible that instead the bypassing of the last cell of the second arm in the sequence is delayed to a current zero crossing, possibly combined with a negative voltage difference between the DC link voltage and the sum of inserted capacitors of both upper and lower arm.

In case the first scheme is used in the above-mentioned transition from the second to the first voltage level and there is an ingoing current, it is in an analogous way possible that the last cell used in the group may be a cell that is bypassed in the upper arm.

The method may here be further varied through employing cell voltage balancing. Between the transitions, the control unit 12 may sort the cells according to a cell voltage balancing scheme. so that the cell being inserted or bypassed last is the last cell of a cell sequence obtained through the sorting. The cells may be sorted according voltages. They may then be inserted and bypassed according to the sorting order either in an increasing order a decreasing order depending on the current direction. The cell sequence may therefore be a sequence of increasing cell voltages or a sequence of decreasing cell voltages. In this way it is then possible to avoid re-using a cell for resonance handling in two consecutive transitions of the same type, e.g. for two consecutive negative slope transitions.

There are several advantages associated with the previously described method of limiting resonance.

- It reduces the losses caused by the resonances occurring through the use of the Quasi-Two Level (Q2L) conversion technique. Thereby also the efficiency is improved.
- The 'resonance cutting cell' does not need any special design, it could be selected to be any cell by the control unit in real operation. There is thus no need for any additional hardware or special cell design. It is possible to implement the invention only through additional software, which also makes it economical
- If the 'resonance cutting cell' needs to have well-regulated cell voltage to perfectly cut the resonance, then. this can be achieved by controlling cell insertion sorting algorithm and dwelling time
- In ideal case, the parallelization can be eliminated by the proposed method
- The current stress on the components is also limited, which allows the component size to be reduced It also improves the tolerance of cell capacitor voltage ripple and allows the capacitance to be reduced.
- The freedom for dwelling time selection for converter control based on the Q2L technique is also released, which is critical for harmonics and EMI issue.

In the operation described in relation to FIG. 5, the cell that was handled was selected during the commutation process, i.e. during the transition between two voltage levels.

It is as an alternative possible that the cell is selected in advance before the commutation sequence is started. The cell may thus be pre-chosen before the starting of a commutation sequence, i.e. before the commutation is actually initiated. It is additionally possible that the complete firing sequence is predicted and calculated by the control unit before each arm commutation is done. This is especially the case when a cell balancing is carried out.

Figure 6:
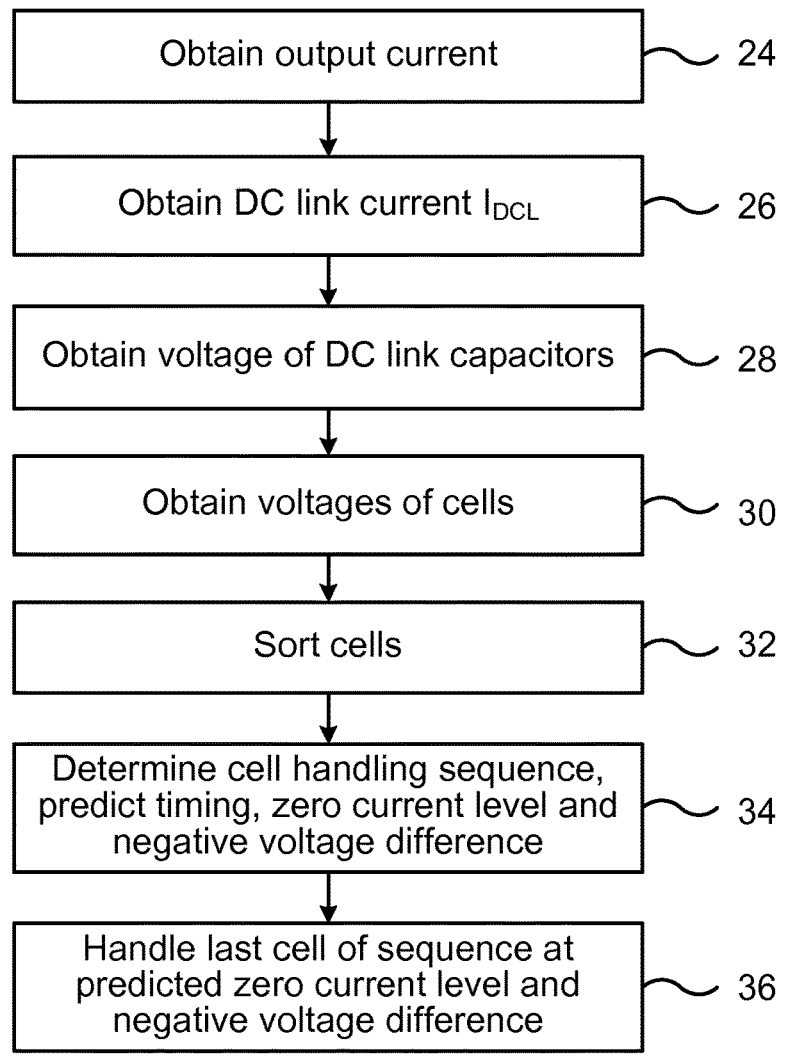
FIG. 6 shows a flow chart of a number of method steps in a second way to control the converter for limiting resonance, FIG. 7 schematically shows a second cell-based voltage source converter, FIG. 8 schematically shows a full bridge cell that may be used in the converters.

How this may be achieved will now be described with reference being made to FIG. 6, which shows a flow chart of an alternative way of limiting resonances being performed by the control unit 12.

In order to limit resonances, the control unit 12 obtains values of the output current, i.e. the current leaving the AC terminal, step 24. The control unit 12 also obtains values of the DC link current $I_{DCL}$, step 26. The control unit 12 furthermore obtains values of the voltage across a branch of DC link capacitors that are to be connected in parallel with a group of cells used for the transition, step 28, which in this is the voltage across both the first and the second DC link capacitor C1 and C2. The control unit 12 likewise obtains the voltages of the snubber capacitors Csn of the cells of the group, step 30. All these values are obtained before the transition is to be made, i.e. before commutation is initiated. The sequence of the steps may also be changed freely.

As the second scheme for the transition between two of the levels with a negative slope is used, the cells are the cells in the upper arm ua that are being inserted and the DC link current is the current between the DC link capacitors and the upper arm ua.

The control unit 12 then sorts the cells according to the cell voltage balancing scheme so that they may be inserted or bypassed in a cell sequence, step 32. The sorting may as was mentioned earlier involve sorting the cells according to cell voltage.

The control unit 12 then determines the cell sequence, predicts the timing of the steps in the transition, the point in time that the DC link current $I_{DCL}$ reaches zero as well as when the difference between the voltage Vdc of the branch of DC link capacitors and a sum of voltages Vua provided by the group of cells is negative, step 34.

The determining of the cell sequence may be based on the direction of the output current as well as which transition that is to be made, i.e. which type of slope that is to be formed. The cell sequence may then start with the cell having the lowest voltage and then sequentially continue to the cell with the highest voltage. Alternatively, the order may start with the cell having the highest voltage and then sequentially continue to the cell with the lowest voltage. It should be realized that it is possible to use a more complex cell sorting scheme that does not only depend on cell voltage. It is also possible that the dwell time is varied. It is not limited to being equal for the steps.

In the given example the current was an outgoing current and the transition is from high to low. In which case the cell sequence may start with the cell in the upper arm having the lowest voltage and then sequentially continue to the cell in the upper arm with the highest voltage. The cell that has the highest voltage may thereby be selected to be the last cell to be handled, which in this case is the last cell to be inserted.

The prediction of the zero current level and voltage difference may be made based on a model of the converter.

The DC link current may be predicted based on the obtained DC link current, the determined cell sequence and the dwell time. In a similar manner the voltage difference may be predicted based on the DC link voltage, a predicted sum of cell capacitor voltages during the transition, the determined cell sequence and the dwell time. The prediction of the DC link current and the change in sum of DC voltages involves predicting the changes of these because of the charging or discharging of the cell capacitors. The prediction in this case also comprises predicting and applying the effect of resonances.

Based on the above-mentioned predictions, the control unit 12 then predicts when the DC link current will reach zero, such as when it will have a zero crossing and possibly also when the voltage difference is negative. The timing of the last cell to be handled is then set to be when the DC link current is at a zero level while the voltage difference is negative.

The firing scheme, i.e. data about which cells are to be inserted and when, may then stored in a timing table and when it is time to perform the transition the control unit 12 inserts the cells according to the settings in the firing table, which thus involves handling the last cell in the cell sequence at the predicted zero current level when the voltage difference is predicted to be negative, step 36.

Thereby the steps at which all but the last cell are carried out in the sequence is determined based on the dwell time. However, the timing of the insertion of the last cell is determined based on the predicted current zero crossing when a negative voltage difference is also predicted.

Figure 7:
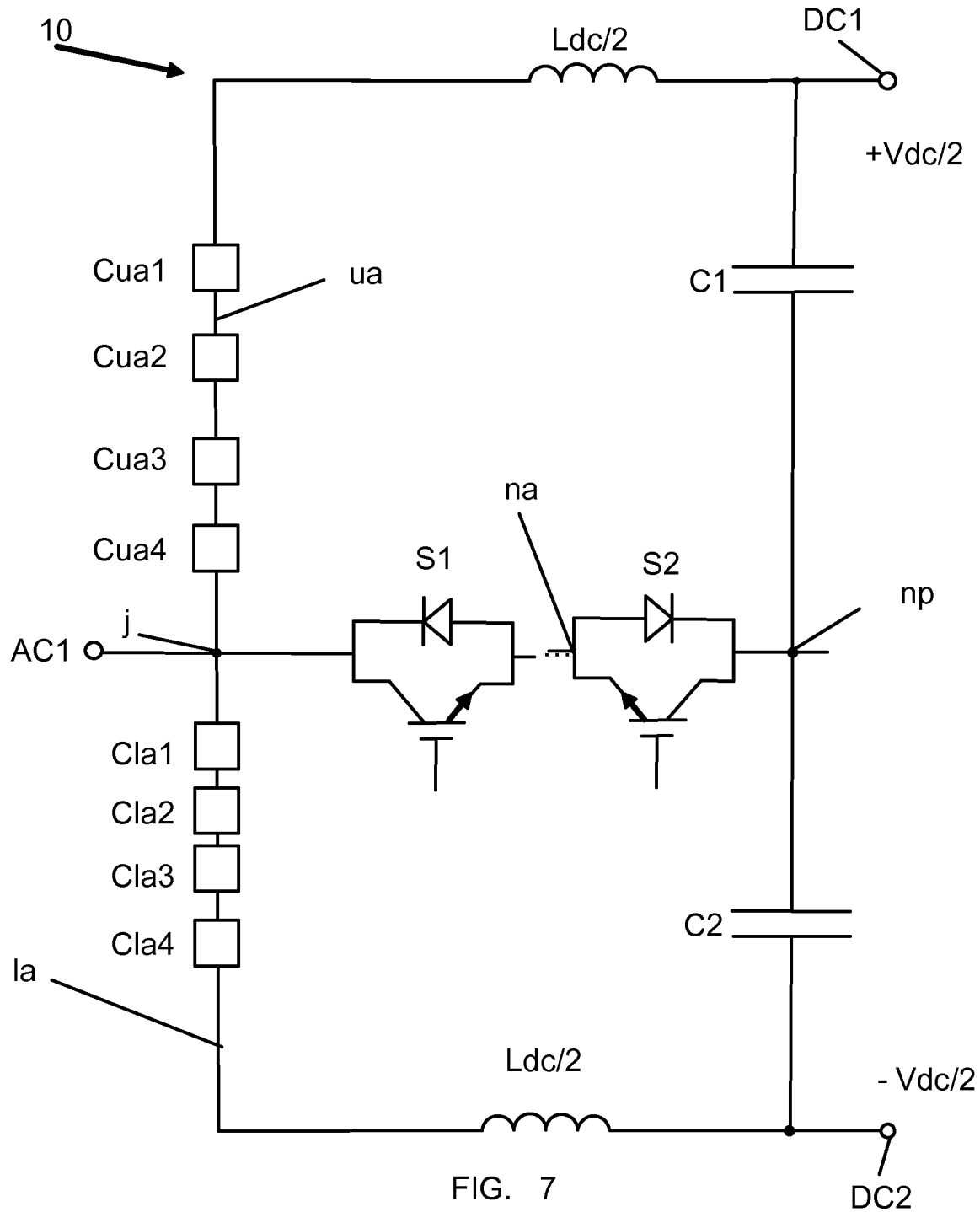

Several variations may also be made to converter in FIG. 1, where one variation is shown in FIG. 7.

The converter 10 in FIG. 7 is shown as comprising three arms, which three arms are also all related to a single AC phase. It should also here be realized that there may be three different phases and thus a totality of nine different arms, with three arms for each phase.

As can be seen in the figure there is the first upper converter arm ua connected between the first DC terminal DC1 and the junction j, the second lower converter arm la connected between the junction j and the second DC terminal DC2, just as the converter in FIG. 1. Also, this converter comprises the string of capacitors C1 and C2 connected between the first and second DC terminals DC1 and DC2 and the first AC terminal AC1 at the junction j. In this case the midpoint of the string of capacitors C1 and C2 is a neutral point np or grounding point. As opposed to the converter in FIG. 1, there is a third neutral converter arm na connected between the junction j and the neutral point.

In a three-phase case there would be three groups of arms, where each group comprises an upper arm, a lower arm and a neutral arm connected to a corresponding AC terminal, with the upper arms of all groups being connected to the first DC terminal, all lower arms connected to the second DC terminal and all neutral arms connected to the capacitor string midpoint. The capacitor string midpoint would thereby be common to all neutral arms.

At least one of the arms comprises cells and any arm that lacks cells only comprises switches for connecting the junction to a corresponding voltage level. In the exemplifying converter 10, the upper and lower arms ua and la comprise cells, which cells are with advantage connected in series or in cascade in an arm, and thereby the neutral arm comprises switches.

The neutral arm na, which only comprises switches, i.e. it lacks cells, comprises a first and a second switch S1 and S2, with opposite orientation, where each switch is realized as a combination of a transistor, such as an IGBT with anti-parallel diode on a suitable substrate, such as S or Si. The switch is thereby an Si switch or an SiC switch. Through providing two oppositely oriented switches, the junction j may be connected with and disconnected from the neutral point np independently of the direction of current through the neutral arm. An SiC switch is an example of one type of wide band gap device. It should be realized that it is possible to also user other types of wideband gap devices, such as Gallium Nitride (GaN) switches.

This converter is controlled to provide two pulse trains at the AC terminal AC1 of the converter between +Vdc/2 and zero and between zero and −Vdc/2. The cells in the upper arm are here made to provide transitioning between +Vdc/2 and zero, while the lower arm is made to provide transitioning between zero and −Vdc/2.

The additional switches S1 and S2 are thus turned on every time when all the upper arm cells are inserted in a positive half cycle so that the output voltage is clamped to zero. Similarly, in the negative half cycle, the switches S1 and S2 are turned on every time when all the cells of the lower arm la are inserted in the negative half cycle so that the output voltage is clamped to zero again.

The zero level is thus obtained through connecting the junction j to the neutral point np. It can thereby be seen that the cells in the upper arm will be connected in parallel with the first capacitor C1 and the cells in the lower arm in parallel with the second capacitor C2. This means that for the converter in FIG. 6, the branch of capacitors used for transitions with regard to the generation of one pulse train comprises one half of the link of capacitors, which in this case is only the first capacitor C1, and the group of cells connected in parallel with this branch only comprises the cells in the upper arm ua. The branch of capacitors used for transitions with regard to the generation of the other pulse train comprises the other half of the link, e.g. only comprises the second capacitor C2, and the group of cells connected in parallel with this branch only comprises the cells in the lower arm la. In this case the difference between the first capacitor C1 and the sum of cell voltages of the upper arm ua is used for handling resonances when transitioning between +Vdc/2 and zero, while the difference between the second capacitor C2 and the sum of cell voltages of the lower arm la is used for handling resonances when transitioning between zero and −Vdc/2.

A variation of the converter in FIG. 7, is that it is possible is that the neutral arm instead comprises cells, while the upper and lower arms comprises switches, in which case the group of cells only comprises the cells of the neutral arm that are connected in parallel with either the first or the second DC link capacitor.

Figure 8:
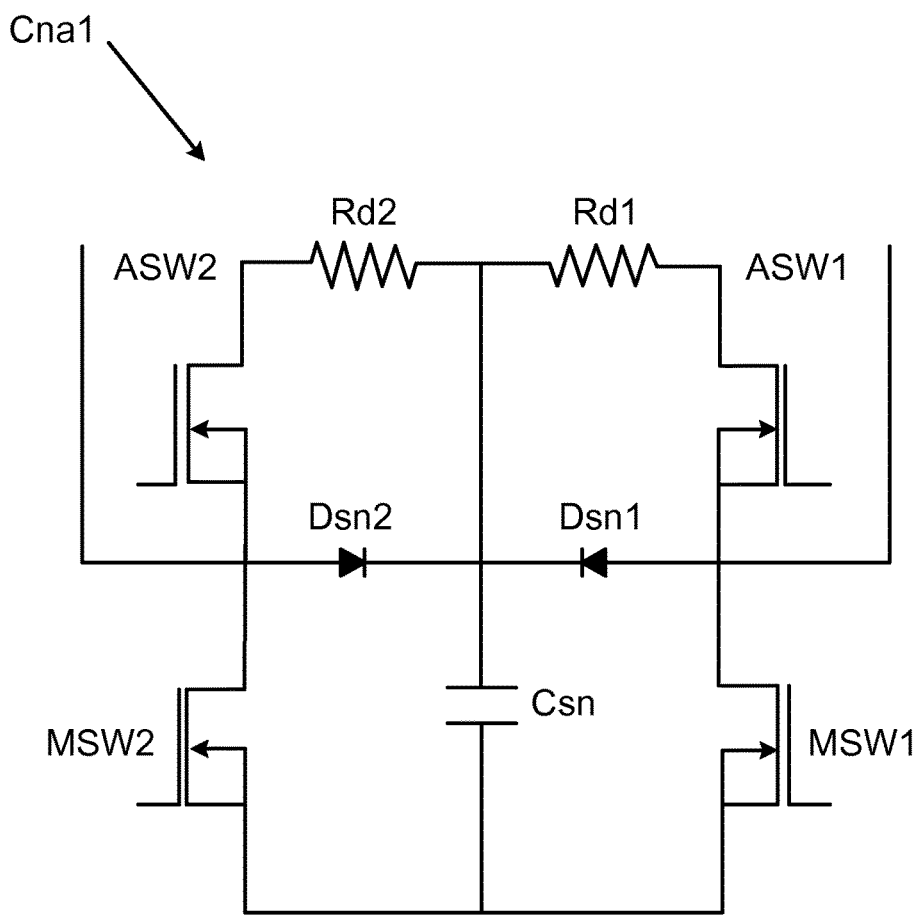

Another possible variation is the use of bipolar cells, i.e. cells having bipolar voltage contribution capability, and have as an example a full-bridge structure. One realization of such a cell is shown in FIG. 8, which is a variation of the cell in FIG. 2B. The cell Cna1 comprises a first main switch MSW1. A first end of this first main switch MSW1 is connected to a first end of a snubber capacitor Csn via a series connection of a first auxiliary switch ASW1 and a first optional damping resistor Rd1. There is also a second main switch MSW2 having a first end connected to the same first end of the snubber capacitor Csn via a series connection of a second auxiliary switch ASW2 and an optional second damping resistor Rd2. In this case there is also an optional first snubber diode Dsn1 connected between a first and a second junction, where the first junction is a junction between the two switches ASW12 and MSW1 and the second junction is a junction between the first damping resistor Rd1, the second damping resistor Rd2 and the snubber capacitor Csn. There is also an optional second snubber diode Dsn2 connected between a third and the second junction, where the third junction is a junction between the two switches ASW2 and MSW2. Both diodes Dsn1 and Dsn2 conduct current towards the snubber capacitor Csn. Finally, second ends of the first and second main switches MSW1 and MSW2 are also connected to a second end of the snubber capacitor Csn. A first connection terminal of the cell Cna1 is provided at the first junction, while a second connection terminal of the cell is provided at the third junction. The cell Cna1 may be switched to provide a voltage contribution corresponding to the positive voltage of the snubber capacitor Csn, to the negative voltage of the snubber capacitor Csn or a zero voltage. When providing a voltage corresponding to the voltage of the snubber capacitor Csn the cell inserts the voltage of the snubber capacitor Csn. When no voltage or a zero voltage is provided by the cell Cna1 then the snubber capacitor Csn is bypassed. Also in this case the snubber diodes may be connected in parallel only with the corresponding damping resistors. It is also possible to remove both damping resistors and snubber diodes.

When such cells are used they may be used for inserting negative voltages and thereby they may be used in all of the above-mentioned transitions irrespective of in which arm they are placed. As an example, it is thereby possible to insert a cell in the lower arm of the converter in FIG. 1 when transitioning from the first to the second voltage level and this cell could also be the last cell being inserted.

As was mentioned earlier, the control unit may be provided in the form of a processor with associated program memory including computer program code for performing its functionality or in the form of a digital signal processor (DSP), Application Specific Integrated Circuit (ASIC) or Field-Programmable Gate Array (FPGA).

Figure 9:
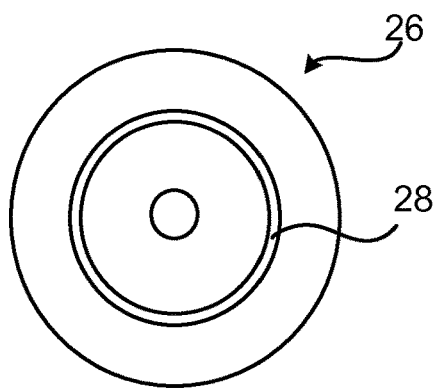
FIG. 9 shows a storage medium on which computer program code for realizing the resonance limiting functionality may be provided.

A computer program may also be a computer program product, for instance in the form of a computer readable storage medium or data carrier carrying a computer program with the computer program code, which will implement the functionality of the above-described control unit when being loaded into a processor. One such computer program product in the form of a CD ROM disc 38 with the above-mentioned computer program code 40 is schematically shown in FIG. 9.

It should be realized that it is possible that the neutral arm also comprises unipolar cells, such as half-bridge cells.

It should be realized that it is possible to perform further variations in addition to those already described. The switches are not limited to employing IGBTs and MOSFETs. A switch may for instance be based on a Junction Field Effect Transistor (JFET) instead. Also Integrated Gate-Commutated Thyristors (IGCTs) may be used.

From the foregoing discussion it is evident that the present invention can be varied in a multitude of ways. It shall consequently be realized that the present invention is only to be limited by the following claims.

The invention claimed is:

1. A voltage source converter configured to generate a pulse train using two voltage levels, the voltage source converter comprising:
   a first converter arm coupled between a junction and a first DC terminal having a first voltage level;
   a second converter arm coupled between the junction and a second DC terminal having a second voltage level, wherein at least one of the first and second converter arms comprises a group of cells;
   a string of capacitors coupled between the first and second DC terminals;
   a control unit configured to control the group of cells used in a transition between the first and second voltage levels for commutating a current running through a corresponding one of the first and second converter arms involved in the transition;
   wherein, when controlling the group of cells, the control unit is configured to obtain values of a current running between the string of capacitors and a corresponding one of the first and second converter arms and handle a cell of the group of cells selected to be used last for reaching one of the first and second voltage levels, the handling comprising inserting or bypassing the cell when the current between the string of capacitors and the corresponding one of the first and second converter arms is at a zero level such that resonance in the voltage source converter is limited.

2. The voltage source converter according to claim 1, wherein capacitors of the group of cells are coupled in parallel with a branch of capacitors during the commutation;
wherein the branch of capacitors comprises at least one of the capacitors of the string of capacitors and the control unit is further configured to determine a difference between the voltage of the branch of capacitors and a sum of voltages provided by the group of cells; and
wherein the cell is handled when the voltage difference is negative.

3. The voltage source converter according to claim 1, wherein the cell that is to be used last in a specific transition between the first and second voltage levels is selected by the control unit when the transition is ongoing.

4. The voltage source converter according to claim 1, wherein the control unit is further configured to sort the group of cells according to a cell voltage balancing scheme so that the cell being inserted or bypassed is the last cell of a cell sequence obtained through the sorting.

5. The voltage source converter according to claim 4, wherein the cell that is to be used last in a specific transition between the first and second voltage levels is selected by the control unit before the transition has been initiated.

6. The voltage source converter according to claim 5, wherein the current between the string of capacitors and the group of cells is obtained before transition has been initiated and the control unit is further configured to predict when the current running between the string of capacitors and the corresponding one of the first and second converter arms will reach zero based on the obtained values and the cell sequence according to the cell voltage balancing scheme and handle the selected cell at a predicted zero level.

7. The voltage source converter according to claim 1, wherein the first and second converter arms comprise the group of cells and the last cell being handled comprises a last cell being inserted in the first converter arm.

8. The voltage source converter according to claim 1, wherein the first and second converter arms comprise the group of cells and the last cell being handled comprises a last cell being bypassed in the second converter arm.

9. The voltage source converter according to claim 1, wherein the string of capacitors comprises a complete link of capacitors.

10. The voltage source converter according to claim 1, wherein each cell comprises a first main switch, a first auxiliary switch and a snubber capacitor; and
wherein the first main switches of the group of cells are configured to switch between the first and second voltage levels and the first auxiliary switches of the group of cells are configured to couple snubber capacitors to introduce a positive or a negative slope in the transition between the first and second voltage levels.

11. The voltage source converter according to claim 10, wherein each of the group of cells further comprises a first damping resistor between the first auxiliary switch and the snubber capacitor.

12. A method of limiting resonance in a voltage source converter that generates a pulse train using two voltage levels, the voltage source converter comprising a first converter arm coupled between a junction and a first DC terminal having a first voltage level, a second converter arm coupled between the junction and a second DC terminal having a second voltage level and a string of capacitors coupled between the first and second DC terminals, wherein at least one of the first and second converter arms comprises a group of cells, the method comprising:
controlling the group of cells used in a transition between the two voltage levels for commutating a current running through a corresponding one of the first and second converter arms involved in the transition, wherein controlling the group of cells comprises:
obtaining values of a current running between the string of capacitors and a corresponding one of the first and second converter arms; and
handling a cell of the group of cells selected to be used last for reaching one of the voltage levels, wherein the handling comprises inserting or bypassing the cell when the current between the string of capacitors and the corresponding one of the first and second converter arms is at a zero level such that resonance in the voltage source converter is limited.

13. The method according to claim 12, wherein capacitors of the group of cells are coupled in parallel with a branch of capacitors during the commutation;
wherein the branch of capacitors comprises at least one of the capacitors of the string of capacitors; and
wherein the method further comprises determining a difference between the voltage of the branch of capacitors and a sum of voltages provided by the group of cells, wherein the last cell is handled when the voltage difference is negative.

14. The method according to claim 12, further comprising sorting the group of cells according to a cell voltage balancing scheme so that the last cell being inserted or bypassed is the last cell of a cell sequence obtained through the sorting.

15. The method according to claim 12, wherein the cell that is to be used last in a specific transition between the two voltage levels is selected when the transition is ongoing.

16. The method according to claim 12, wherein the cell that is to be used last in a specific transition between the two voltage levels is selected before the transition has been initiated.

17. A voltage source converter comprising:
a first converter arm coupled between a junction and a first DC terminal having a first voltage level;
a second converter arm coupled between the junction and a second DC terminal having a second voltage level, wherein at least one of the first and second converter arms comprises a group of cells;
a string of capacitors coupled between the first and second DC terminals;
a control unit;
a non-transitory memory storing computer program code that, when executed by the control unit causes the control unit to control the group of cells used in a transition between the first and second voltage levels for commutating a current running through a corresponding one of the first and second converter arms involved in the transition by:
obtaining values of a current running between the string of capacitors and a corresponding one of the first and second converter arms; and
handling a cell of the group of cells selected to be used last for reaching one of the first and second voltage levels, wherein the handling comprises inserting or bypassing the cell when the current between the string of capacitors and the corresponding one of the first and second converter arms is at a zero level such that resonance in the voltage source converter is limited.

18. The voltage source converter according to claim 17, wherein the first and second converter arms comprise the group of cells and the last cell being handled comprises a last cell being inserted in the first converter arm.

19. The voltage source converter according to claim 17, wherein the first and second converter arms comprise the group of cells and the last cell being handled comprises a last cell being bypassed in the second converter arm.

20. The voltage source converter according to claim 17, wherein the string of capacitors comprises a complete link of capacitors.

* * * * *